United States Patent Office 3,279,128
Patented Oct. 18, 1966

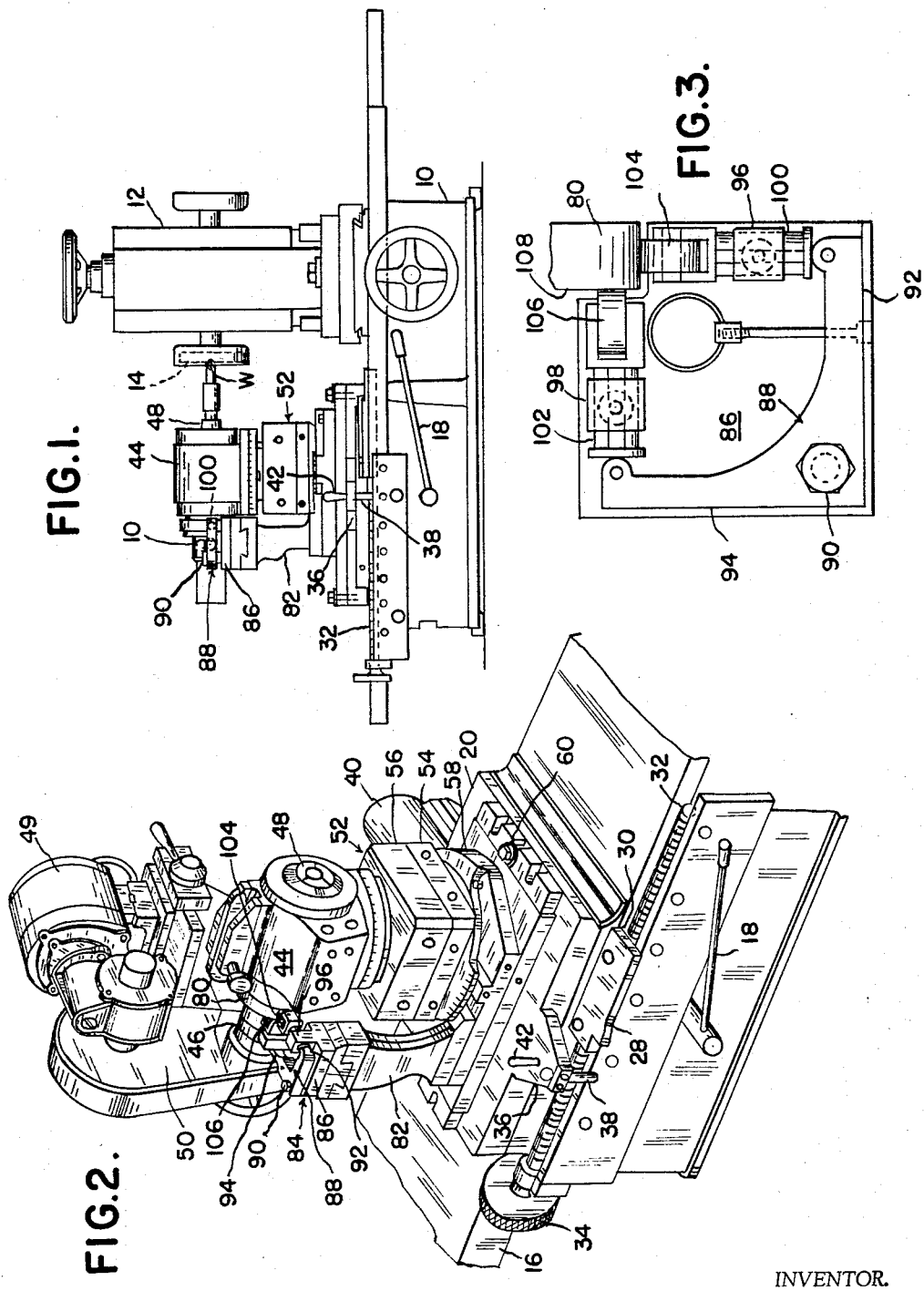

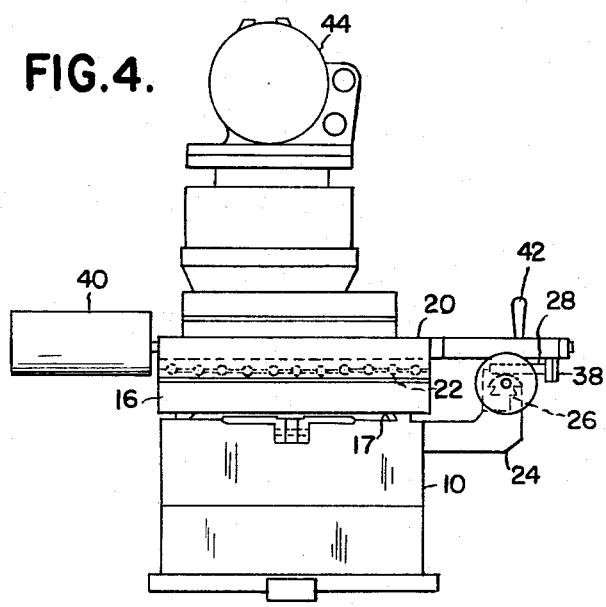
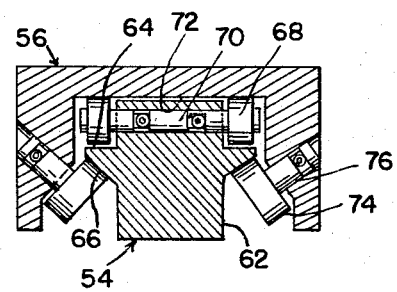
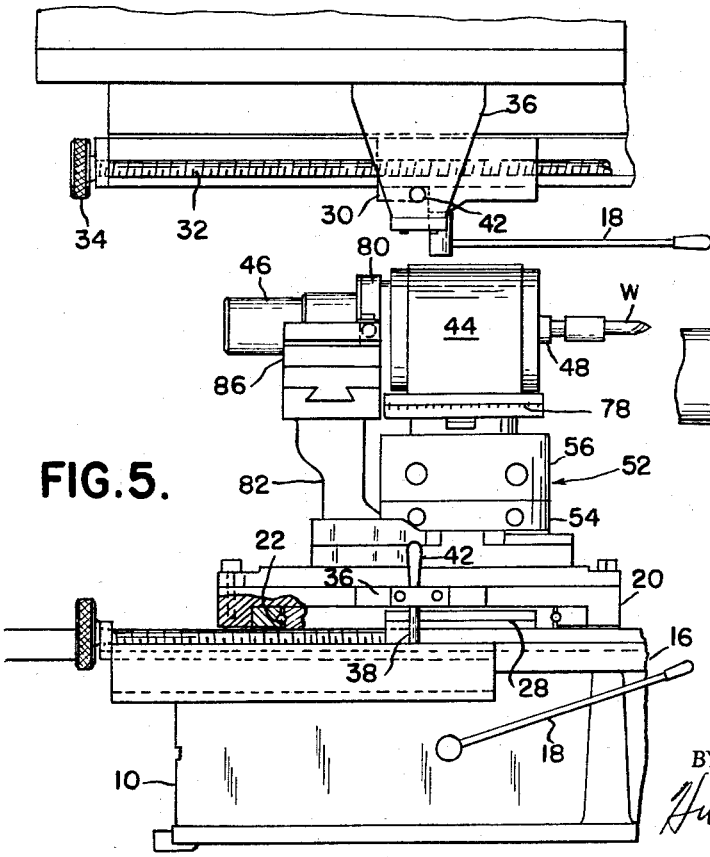
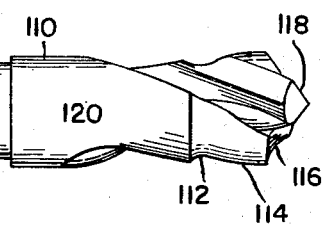

3,279,128
CONTOURING FORM RELIEVING FIXTURE
Elwood C. Hemlin, Madison Heights, Mich., assignor to R-O Manufacturing Company, Madison Heights, Mich., a corporation of Michigan
Filed Dec. 17, 1963, Ser. No. 331,305
7 Claims. (Cl. 51—232)

The present invention relates to a contouring form relieving fixture particularly designed for use in a grinder.

It is an object of the present invention to provide a form relieving fixture capable of use with cutting tools, particularly fluted cutting tools, having a contoured shape which may be of regular or irregular contour.

It is a further object of the present invention to provide a fixture of the character described including means for supporting and rotating a work piece, means for advancing the workpiece generally longitudinally or in the direction of its axis, and means automatically operable to effect transverse movement of the work piece in timed relation to its axial advance in accordance with the contour of the work piece, and further means automatically operable in accordance with rotation of the work piece to provide an independent transverse relieving motion thereto.

It is a feature of the present invention to provide, in a machine tool of the character described, a contouring form relieving fixture comprising a sub-slide movable horizontally, transverse mechanism for effecting slow traverse of said sub-slide, a cross slide movable on said sub-slide in a direction perpendicular to the direction of movement of the sub-slide, a work support including a rotary work spindle, adjustable rectilinear guide means interposed between said cross slide and said work support and angularly adjustable relative to said cross slide and said work support, cam means for effecting movement of said cross slide on said sub-slide in timed relation to movement of said sub-slide, and additional cam means including a cam rotatable with said work spindle and cam follower mechanism effective to move said work support in the direction determined by the adjustment of said guide means in timed relation to rotation of said work spindle.

It is a further feature of the present invention to provide rectilinear guide means comprising an elongated rail having laterally extending ribs at the sides thereof, the ribs being provided with downwardly and inwardly inclined guide surfaces, support rollers carried by said rail, a slide member of generally inverted U-shaped cross-section having an inner surface supported on said support rollers, said slide member having guide rollers engageable with the inclined guide surfaces.

Other objects and features of the invention will become apparent as the description proceeds, especially when taken in conjunction with the accompanying drawings, illustrating a preferred embodiment of the invention, wherein:

FIGURE 1 is a front elevation of the grinder including the contouring form relieving fixture.

FIGURE 2 is an enlarged perspective view of the contouring form relieving fixture.

FIGURE 3 is an enlarged plan view showing cam mechanism associated with the rotary work spindle.

FIGURE 4 is an end view of the form relieving fixture.

FIGURE 5 is a a fragmentary front elevation of the machine showing the form relieving fixture.

FIGURE 6 is a sectional view through the adjustable guide mechanism.

FIGURE 7 is an enlarged fragmentary plan view of the relieving fixture.

FIGURE 8 is an elevational view of a tool which may be ground by the present machine.

In FIGURE 1 the machine is illustrated as comprising a base 10 including an adjustable pedestal 12 adapted to carry a grinding wheel indicated at 14.

Mounted on the base 10 is a sub-slide 16 which is mounted on rectilinear ways 17 for movement in a direction from left to right in FIGURES 1 and 5. Means are provided for effecting a slow traverse of the sub-slide 16 and this means may comprise rack and pinion mechanism including a pinion actuating handle 18. By this means the operator can effect movement of the sub-slide by manual operation of the handle 18. Mounted on the sub-slide 16 for horizontal movement in a direction perpendicular to the direction of movement of the sub-slide 16 is a cross slide 20. In FIGURE 4 guide means 22 are provided between the sub-slide and the cross slide.

Fixed to the base 10 is a bracket 24 including ways 26 for adjustably supporting a cam 28. As best seen in FIGURE 2, the cam 28 is carried by a threaded block 30 connected to an adjusting screw 32 provided with a knob 34 for effecting adjustment thereof. Extending forwardly from the cross slide 20 is a projection 36 carrying a depending pin 38 which is adapted to engage the surface of the cam 28 so as to determine the position of the cross slide 20.

Means are provided for urging the cross slide 20 in a direction to maintain the follower pin 38 in engagement with the cam and this means is herein illustrated as comprising an air cylinder 40 having a piston therein connected to the cross slide 20. Conveniently, a handle 42 is provided on the cross slide so that it can be moved manually along the guide means 22.

Means for supporting a work piece, which in FIGURE 5 is indicated at W, is provided and this means comprises a work support or spindle housing 44 including a rotatable spindle 46 including suitable chucking means indicated diagrammatically at 48. In practice, the tool spindle may be rotated manually but it is preferred to provide power means for effecting a slow rotation and this means is indicated in FIGURE 2 as comprising a motor 49 having drive means including a flexible belt within the housing 50 connected to the spindle 46.

Interposed between the work support or spindle housing 44 and the cross slide 20 is adjustable guide means indicated generally at 52. The guide means 52 comprises a lower guide member 54 and an upper guide member 56. The guide members 54 and 56 are angularly adjustable about a vertical axis on the plate structure 58 which is clamped to the cross slide 20 by suitable means such for example as the screw 60. The lower guide member 54 includes an elongated rail 62 best seen in FIGURE 6, the rail being provided at opposite sides with a pair of laterally extending elongated ribs 64. Each of the ribs is provided at its underside with downwardly and inwardly inclined guide surfaces 66. Above the ribs 64 the rail 62 is provided with a multiplicity of support rollers 68 here illustrated as carried by shafts 70. The upper guide member or slide 56 is of generally inverted U-shape in cross-section and includes a downwardly facing surface 72 which rests on the rollers 68. The sides of the guide member 56 carry guide rollers 74 mounted on shafts received in adjustable eccentric sleeves 76. With this arrangement the slide 56 may be mounted for smooth reciprocation and all backlash or play between the slide and rail may be eliminated.

The work support or spindle 44 is angularly adjustable on the upper guide member 56 about a vertical axis and preferably, suitable indicia indicated generally at 78 is provided so that the work spindle housing 44 may be presented in parallelism with the ways on which the sub-slide 16 is movable.

With this arrangement the guide means 52 may be adjusted as a unit simultaneously with reference to the cross slide 20 and the work support or spindle housing 44.

Means are provided for effecting a back and forth relieving movement to a work piece in timed relation to its rotation and this means comprises a cam 80 fixed to the work spindle 46.

Fixedly mounted on the plate structure 58 is a pedestal 82 which at its upper end mounts cam follower mechanism indicated generally at 84 in FIGURE 2 and shown in detail in FIGURE 3. The pedestal 82 includes a mounting plate 86 at its upper end. A bell crank lever 88 is pivoted to the plate 86 by pivot means indicated at 90 and includes arms 92 and 94. The plate 86 is provided with upwardly extending guide projections 96 and 98 in which are slidable push roll assemblies 100 and 102 respectively. The push roll assemblies include rollers 104 and 106. The roller 104 engages the peripheral surface of the rotary cam 80. The roller 106 engages a flat end surface 108 of the cam 80. In use the cam 80 is selected to have the same number of lobes as there are flutes in the tool or work piece being ground. With this arrangement rotation of the work spindle 46 causes corresponding rotation of the cam 80 and the lobes of the cam bear against the roller 104, thus applying pressure to the arm 92 of the bell crank lever 88. Since the bell crank lever is mounted for pivotal movement about the pivot mounting 90, this force rocks the bell crank lever about its pivot 90 so that the lever arm 94 bears against the roller assembly 102 and thus establishes a force tending to move the cam 80 and hence the work spindle 46 and the entire spindle housing or work support 44 to the right. If the guide means 52 has been adjusted so that the rail 62 extends parallel to the axis of the work spindle, the force applied thereto through the roller 106 causes the work support to move horizontal to its axis and to the direction of movement of the sub-slide 16. If however, the guide means 52 is adjusted so that the rail 62 extends perpendicular to the axis of the spindle, force applied by the roller 106 to the radially extending cam surface 108 is ineffective to displace the work support parallel to its axis. In this case the bell crank lever 88 is blocked against movement and the reaction between the cam 80 and the roller 104 is effective to move the entire work support perpendicular to the axis of the work spindle 46. If the guide means 52 is adjusted so that the rail 62 extends obliquely with respect to the direction of movement of the sub-slide 16, then the bell crank lever 88 rocks sufficiently to cause displacement of the work support in parallelism with the rail 62.

With this mechanism, relieving movement of the work in timed relation to its rotation may be provided automatically, and this relieving movement may be such as to provide radial relief, axial relief, or any combinations of radial and axial relief, by appropriate adjustment of the guide means 52.

It will of course be understood that suitable means, such for example as compression springs acting between guide members 54 and 56, are effective to urge the member 56 in a direction to maintain pressure between the cam 80 and the rollers 104 and 106.

Referring now to FIGURE 8 there is illustrated a work piece 110 having its cutting end contoured to provide the concave portion 112, a convex portion 114, a concavely curved portion 116, and a pointed end 118. The tool is provided with one or more flutes, one of which is indicated at 120. In grinding this tool a plate cam 28 is formed having its cam surface corresponding to the contour of the surfaces 112, 114 and 116 of the work piece. A rotary cam 80 is selected having lobes corresponding to the number of flutes in the work piece and this cam is affixed to the work spindle 46. The grinding wheel is of course trimmed and adjusted to present itself properly to the work piece 110. As each cutting edge of the work piece passes the grinding wheel the work piece is given a relieving movement dependent upon the exact shape of the lobes on the cam 80. In addition, as the sub-slide 16 is moved longitudinally the work support is moved in a direction parallel to the axis of the work piece so that the work piece may be ground progressively in an axial direction. The contoured cam 28 moves the cross slide 20 in timed relation to axial advance of the work piece so that the grinding wheel is caused to follow the contour of the work piece. Moreover, the camming motions developed by the cams 28 and 80 are independent of each other so that the required relieving motion is imparted to the cutter irrespective of the point on the contoured work piece at which the grinding wheel is operating.

The mechanism described thus provides for rotation of the work piece, axial traverse of the work piece, a transverse displacement of the work piece in timed relation to its axial traverse in accordance with its peripheral contour, and superimposed upon the aforesaid transverse movement an independent transverse, or combined transverse and axial relieving movement in timed relation to rotation thereof. It will be understood that axial displacement of the work piece is accomplished by moving the lever or handle 18, and that the proper grinding action with the relieving motion is carried out automatically throughout this traverse. If the movement of the handle 18 is terminated then rotation of the work piece continues and the automatic relieving motion in timed relation to rotation continues automatically. In other words, the relieving motion is dependent solely on the rotation of the work piece and the design of the cam 80, whereas the contouring displacement of the work piece is dependent solely on axial movement of the work piece and lateral displacement by the cam 80.

The drawings and the foregoing specification constitute a description of the improved contouring form relieving fixture in such full, clear, concise and exact terms as to enable any person skilled in the art to practice the invention, the scope of which is indicated by the appended claims.

What I claim as my invention is:

1. A contouring form relieving fixture comprising a base, a sub-slide mounted on said base for rectilinear traverse thereon, traverse mechanism connected between said base and sub-slide to provide slow traverse of said sub-slide on said base in a first direction, a cross slide mounted on said sub-slide for rectilinear traverse thereon in a second direction perpendicular to said first direction, a work support, rectilinear guide means connected between said cross slide and said work support and adjustable on said cross slide about an axis perpendicular to a plane parallel to said first and second directions, said work support including a rotary work spindle whose axis is parallel to said plane, means connecting said work support to said rectilinear guide means for angular adjustment about an axis perpendicular to said plane, cam mechanism interposed between said base and said cross slide effective to control movement of said cross slide upon traverse of said sub-slide in accordance with the design of said cam mechanism, a rotary cam fixed to said work spindle, cam actuated mechanism to move said work support back and forth in the direction of said rectilinear guide means in timed relation to rotation of said work spindle.

2. A contouring form relieving fixture comprising a base, a sub-slide mounted on said base for rectilinear traverse thereon, traverse mechanism connected between said base and sub-slide to provide slow traverse of said sub-slide on said base in a first direction, a cross slide mounted on said sub-slide for rectilinear traverse thereon in a second direction perpendicular to said first direction, a work support, rectilinear guide means connected between said cross slide and said work support and adjustable on said cross slide about an axis perpendicular to a plane parallel to said first and second directions, said work support including a rotary work spindle whose axis is parallel to the direction of movement of said sub-slide on said base, means connecting said work support to said rectilinear guide means for angular adjustment about an axis perpendicular to said plane, cam mechanism interposed between said base and said cross slide effective to control movement of said cross slide upon traverse of said sub-slide in accordance with the design of said cam mechanism, a rotary cam fixed to said work spindle, cam actuated mechanism to move said work support back and forth in the direction of said rectilinear guide means in timed relation to rotation of said work spindle.

3. A contouring form relieving fixture comprising a base, a sub-slide mounted on said base for rectilinear traverse thereon, traverse mechanism connected between said base and sub-slide to provide slow traverse of said sub-slide on said base in a first direction, a cross slide mounted on said sub-slide for rectilinear traverse thereon in a second direction perpendicular to said first direction, a work support, rectilinear guide means connected between said cross slide and said work support and adjustable on said cross slide about an axis perpendicular to a plane parallel to said first and second directions, said work support including a rotary work spindle whose axis is parallel to said plane, means connecting said work support to said rectilinear guide means for angular adjustment about an axis perpendicular to said plane, cam mechanism interposed between said base and said cross slide effective to control movement of said cross slide upon traverse of said sub-slide in accordance with the design of said cam mechanism, a rotary cam fixed to said work spindle, cam actuated mechanism comprising lever means carried by said cross slide and operatively connected to said work support to move said work support back and forth in the direction of said rectilinear guide means in timed relation to rotation of said work spindle.

4. A contouring form relieving fixture comprising a base, a sub-slide mounted on said base for horizontal rectilinear traverse thereon, traverse mechanism connected between said base and sub-slide to provide slow traverse of said sub-slide on said base in a first direction, a cross slide mounted on said sub-slide for rectilinear traverse thereon in a second horizontal direction perpendicular to said first direction, a work support, rectilinear horizontal guide means connected between said cross slide and said work support and adjustable on said cross slide about a vertical axis, said work support comprising a horizontal rotary work spindle, means connecting said work support to said rectilinear guide means for angular adjustment about a vertical axis, cam mechanism interposed between said base and said cross slide effective to control movement of said cross slide upon traverse of said sub-slide in accordance with the design of said cam mechanism, a rotary cam fixed to said work spindle, cam actuated mechanism to move said work support back and forth in the direction of said rectilinear guide means in timed relation to rotation of said work spindle.

5. A contouring form relieving fixture comprising a base, a sub-slide mounted on said base for horizontal rectilinear traverse thereon, traverse mechanism connected between said base and sub-slide to provide slow traverse of said sub-slide on said base in a first direction, a cross slide mounted on said sub-slide for rectilinear traverse thereon in a second horizontal direction perpendicular to said first direction, a work support, rectilinear horizontal guide means connected between said cross slide and said work support and adjustable on said cross slide about a vertical axis, said work support comprising a horizontal rotary work spindle whose axis is parallel to the direction of movement of said sub-slide on said base, means connecting said work support to said rectilinear guide means for angular adjustment about a vertical axis, cam mechanism interposed between said base and said cross slide effective to control movement of said cross slide upon traverse of said sub-slide in accordance with the design of said cam mechanism, a rotary cam fixed to said work spindle, cam actuated mechanism to move said work support back and forth in the direction of said rectilinear guide means in timed relation to rotation of said work spindle.

6. A contouring form relieving fixture comprising a base, a sub-slide mounted on said base for horizontal rectilinear traverse thereon, traverse mechanism connected between said base and sub-slide to provide slow traverse of said sub-slide on said base in a first direction, a cross slide mounted on said sub-slide for rectilinear traverse thereon in a second horizontal direction perpendicular to said first direction, a work support, rectilinear horizontal guide means connected between said cross slide and said work support and adjustable on said cross slide about a vertical axis, said work support comprising a horizontal rotary work spindle, means connecting said work support to said rectilinear guide means for angular adjustment about a vertical axis, cam mechanism interposed between said base and said cross slide effective to control movement of said cross slide upon traverse of said sub-slide in accordance with the design of said cam mechanism, a rotary cam fixed to said work spindle, cam actuated mechanism comprising lever means carried by said cross slide and operatively connected to said work support to move said work support back and forth in the direction of said rectilinear guide means in timed relation to rotation of said work spindle.

7. In a machine tool of the character described, a contouring form relieving fixture comprising a sub-slide movable horizontally, traverse mechanism for effecting slow traverse of said sub-slide, a cross slide movable on said sub-slide in a direction perpendicular to the direction of movement of the sub-slide, a work support including a rotary work spindle, adjustable rectilinear guide means interposed between said cross slide and said work support and angularly adjustable relative to said cross slide and said work support, cam means for effecting movement of said cross slide on said sub-slide in timed relation to movement of said sub-slide, and additional cam means including a cam rotatable with said work spindle, and cam follower mechanism effective to move said work support in the direction determined by the adjustment of said guide means in timed relation to rotation of said work spindle.

References Cited by the Examiner
UNITED STATES PATENTS

| | | | |
|---|---|---|---|
| 2,414,182 | 1/1947 | Wessman | 51—232 |
| 2,471,539 | 5/1949 | Parker | 51—232 |
| 2,752,740 | 7/1956 | Mouw | 51—232 |

HAROLD D. WHITEHEAD, *Primary Examiner.*